(12) United States Patent
Haralson et al.

(10) Patent No.: US 9,053,749 B1
(45) Date of Patent: Jun. 9, 2015

(54) DISK DRIVE COMPRISING A PER-DRIVE AND PER-HEAD FLY HEIGHT FILTER

(71) Applicant: Western Digital Technologies, Inc., Irvine, CA (US)

(72) Inventors: Phillip S. Haralson, Laguna Niguel, CA (US); Kent D. Anderson, Broomfield, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/840,225

(22) Filed: Mar. 15, 2013

(51) Int. Cl.
*G11B 21/02* (2006.01)
*G11B 27/36* (2006.01)
*G11B 21/21* (2006.01)
*G11B 5/60* (2006.01)

(52) U.S. Cl.
CPC .............. *G11B 21/21* (2013.01); *G11B 5/6011* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 4,841,389 A | 6/1989 | Hoyt et al. | |
| 5,377,058 A | 12/1994 | Good et al. | |
| 5,677,812 A | 10/1997 | Cha | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,147,488 A | 11/2000 | Bamba et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,266,199 B1 | 7/2001 | Gillis et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,307,817 B1 | 10/2001 | Tsuboi | |
| 6,310,740 B1 | 10/2001 | Dunbar et al. | |
| 6,317,850 B1 | 11/2001 | Rothberg | |
| 6,327,106 B1 | 12/2001 | Rothberg | |

(Continued)

*Primary Examiner* — Andrew L Sniezek (57) ABSTRACT

A disk drive is disclosed comprising a plurality of disk surfaces, and a head actuated over each disk surface, where each head comprises a fly height actuator (FHA) operable to control a fly height of the head over the corresponding disk surface. A fly height is measured for each head to generate a plurality of fly height measurements. An average value is generated in response to the plurality of fly height measurements, and a first control value is generated for a first head based on the average value and the fly height measurement for the first head. The first FHA of the first head is controlled in response to the first control value.

24 Claims, 4 Drawing Sheets

(56) References Cited

U.S. PATENT DOCUMENTS

| | | |
|---|---|---|
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,501,606 B2 | 12/2002 | Boutaghou et al. |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,570,378 B2 | 5/2003 | Goh et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,617 B1 | 8/2003 | Cross |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,608,727 B2 | 8/2003 | Ottesen et al. |
| 6,611,393 B1 | 8/2003 | Nguyen et al. |
| 6,615,312 B1 | 9/2003 | Hamlin et al. |
| 6,630,824 B2 | 10/2003 | Richter |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,674,590 B2 | 1/2004 | Ottesen et al. |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,203 B1 | 2/2004 | Cheng et al. |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,714,368 B1 | 3/2004 | Himle et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,765,745 B2 | 7/2004 | Smith et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,033 B2 | 5/2005 | Weinstein et al. |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,987,630 B1 | 1/2006 | Higgins et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |

(56) References Cited

U.S. PATENT DOCUMENTS

| | | |
|---|---|---|
| 7,031,902 B1 | 4/2006 | Catiller |
| 7,038,875 B2 | 5/2006 | Lou et al. |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,068,451 B1 | 6/2006 | Wang et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,196,860 B2 | 3/2007 | Alex |
| 7,200,698 B1 | 4/2007 | Rothberg |
| 7,205,805 B1 | 4/2007 | Bennett |
| 7,206,497 B1 | 4/2007 | Boyle et al. |
| 7,209,304 B2 | 4/2007 | Seng et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,265,933 B1 | 9/2007 | Phan et al. |
| 7,268,966 B2 | 9/2007 | Pit et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,299 B1 | 1/2008 | Schreck et al. |
| 7,325,244 B2 | 1/2008 | Boyle et al. |
| 7,330,323 B1 | 2/2008 | Singh et al. |
| 7,330,324 B2 | 2/2008 | Morinaga et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,423,830 B2 | 9/2008 | Ma et al. |
| 7,426,090 B2 | 9/2008 | Yamashita et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,477,465 B2 | 1/2009 | Yu |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,626,779 B2 | 12/2009 | Kuwahara |
| 7,633,696 B2 | 12/2009 | Kassab |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,729,080 B2 | 6/2010 | Suzuki |
| 7,730,295 B1 | 6/2010 | Lee |
| 7,760,458 B1 | 7/2010 | Trinh |
| 7,760,462 B2 | 7/2010 | Shibasaki |
| 7,768,776 B1 | 8/2010 | Szeremeta et al. |
| 7,804,657 B1 | 9/2010 | Hogg et al. |
| 7,808,740 B2 | 10/2010 | Tanabe |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 | 3/2011 | McFadyen et al. |
| 7,920,346 B2 | 4/2011 | Tse et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |

(56) References Cited

U.S. PATENT DOCUMENTS

| | | |
|---|---|---|
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 | 11/2012 | Knigge et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2002/0062470 A1 | 5/2002 | Yang et al. |
| 2002/0063559 A1 | 5/2002 | Richter |
| 2002/0118483 A1 | 8/2002 | Meyer et al. |
| 2003/0016461 A1 | 1/2003 | Seng et al. |
| 2003/0043491 A1 | 3/2003 | Riddering et al. |
| 2003/0067697 A1 | 4/2003 | Weinstein et al. |
| 2003/0132747 A1 | 7/2003 | Hong et al. |
| 2003/0172520 A1* | 9/2003 | Liu et al. .............. 29/603.03 |
| 2005/0169415 A1 | 8/2005 | Nayak et al. |
| 2005/0185312 A1 | 8/2005 | Ueda et al. |
| 2006/0158769 A1 | 7/2006 | Ono et al. |
| 2007/0002486 A1 | 1/2007 | Ahn et al. |

(56) References Cited

U.S. PATENT DOCUMENTS

| | | |
|---|---|---|
| 2007/0230020 A1* | 10/2007 | Leis .................... 360/75 |
| 2007/0268613 A1 | 11/2007 | Fitzpatrick et al. |
| 2007/0268615 A1 | 11/2007 | McFadyen et al. |
| 2008/0030888 A1* | 2/2008 | Brunnett et al. ............ 360/75 |
| 2008/0130159 A1 | 6/2008 | Dieron et al. |
| 2008/0165443 A1 | 7/2008 | Moline |
| 2008/0165446 A1 | 7/2008 | Partee |
| 2008/0174902 A1 | 7/2008 | Kim et al. |
| 2008/0316636 A1 | 12/2008 | Kuwahara |
| 2009/0113702 A1 | 5/2009 | Hogg |
| 2009/0122437 A1 | 5/2009 | Gong et al. |
| 2009/0141391 A1 | 6/2009 | Kuramoto et al. |
| 2009/0195902 A1 | 8/2009 | Moser et al. |
| 2009/0196129 A1 | 8/2009 | Suzuki et al. |
| 2009/0237830 A1 | 9/2009 | Shibasaki |
| 2009/0251828 A1 | 10/2009 | Schreck et al. |
| 2009/0310247 A1 | 12/2009 | Suzuki |
| 2010/0128383 A1 | 5/2010 | Matsushita et al. |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

DISK DRIVE COMPRISING A PER-DRIVE AND PER-HEAD FLY HEIGHT FILTER

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

An air bearing forms between the head and the disk due to the disk rotating at high speeds. Since the quality of the write/read signal depends on the fly height of the head, conventional heads (e.g., magnetoresistive heads) may comprise a fly height actuator (FHA) for controlling the fly height. Any suitable FHA may be employed, such as a heater which controls fly height through thermal expansion, or a piezoelectric (PZT) actuator. It is desirable to determine the appropriate setting for the FHA control signal (e.g., appropriate current applied to a heater) that achieves the target fly height for the head.

DETAILED DESCRIPTION

Figures 1A, 1D:
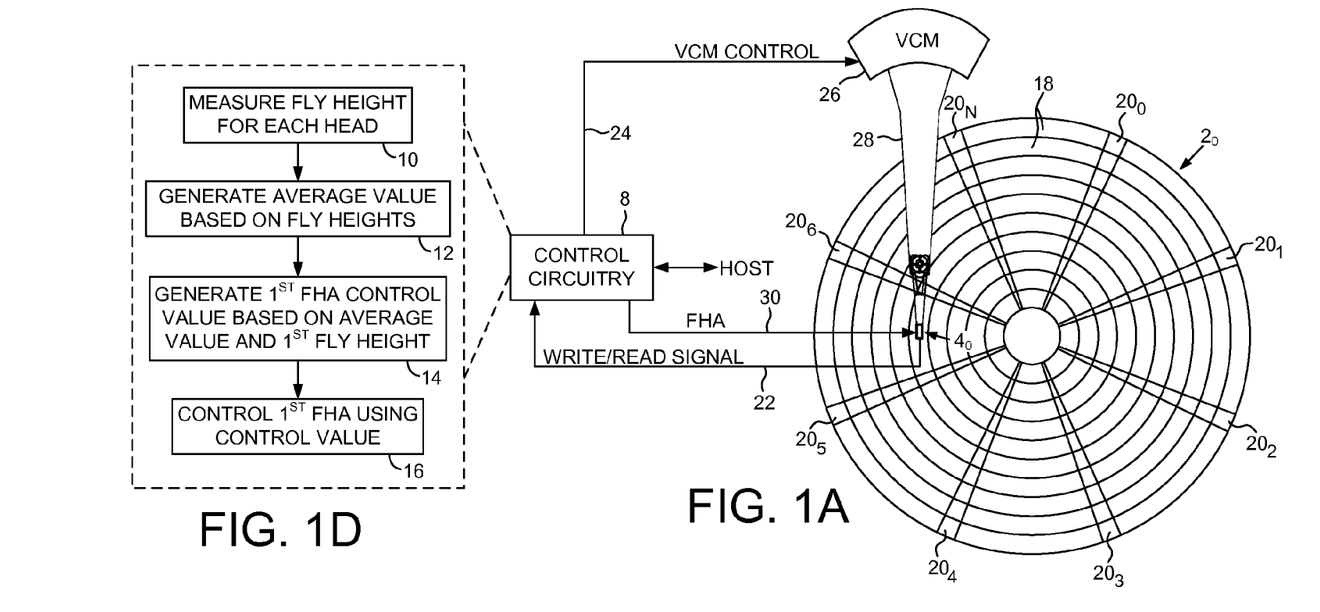
FIGS. 1A and 1B show a disk drive according to an embodiment comprising a plurality of heads actuated over respective disk surfaces.
FIG. 1D is a flow diagram according to an embodiment wherein the FHA for a first head is controlled based on an average value (e.g., average fly height delta) measured for all of the heads and the fly height measurement for the first head.
Figure 1B:
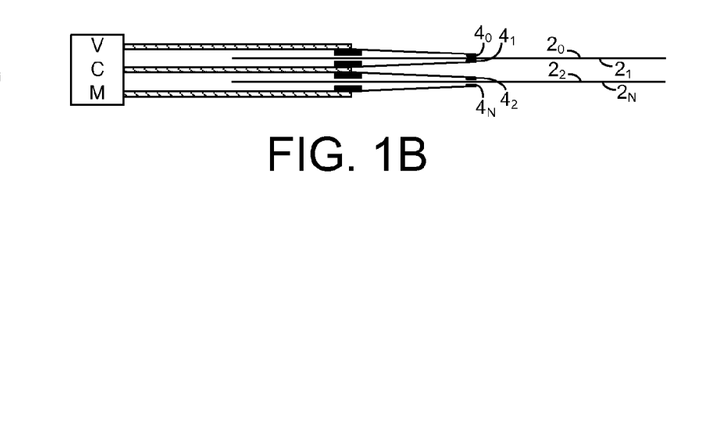
Figure 1C:
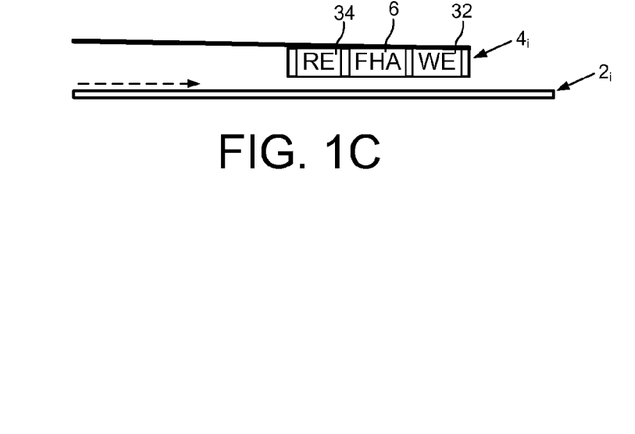
FIG. 1C shows a head according to an embodiment comprising a write element, a read element, and a fly height actuator (FHA).

FIGS. 1A and 1B show a disk drive according to an embodiment comprising a plurality of disk surfaces $2_0$-$2_N$, and a head $4_0$-$4_N$ actuated over each disk surface $2_0$-$2_N$, where each head $4_i$ (FIG. 1C) comprises a fly height actuator (FHA) 6 operable to control a fly height of the head $4_i$ over the corresponding disk surface $2_i$. The disk drive further comprises control circuitry 8 operable to execute the flow diagram of FIG. 1D, wherein a fly height is measured for each head to generate a plurality of fly height measurements (block 10). An average value is generated in response to the plurality of fly height measurements (block 12), and a first control value is generated for a first head based on the average value and the fly height measurement for the first head (block 14). The first FHA of the first head is controlled in response to the first control value (block 16).

In the embodiment of FIG. 1A, each disk surface $2_i$ comprises a plurality of servo tracks 18 defined by servo sectors $20_0$-$20_N$, wherein data tracks are defined relative to the servo tracks at the same or different radial density. The control circuitry 8 processes a read signal 22 emanating from the head $4_i$ to demodulate the servo sectors $20_0$-$20_N$ and generate a position error signal (PES) representing an error between the actual position of the head and a target position relative to a target track. The control circuitry 8 filters the PES using a suitable compensation filter to generate a control signal 24 applied to a voice coil motor (VCM) 26 which rotates an actuator arm 28 about a pivot in order to actuate the head $4_i$ radially over the disk surface $2_i$ in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the control circuitry 8 reserves at least one data track on each disk surface $2_i$ for measuring the fly height of each head $4_i$. In one embodiment, the control circuitry 8 writes a test pattern (e.g., a periodic pattern) to each reserved data track. The control circuitry 8 may then periodically seek the heads to the reserved data tracks in order to read the test pattern and generate a fly height measurement. An FHA control signal 30 is adjusted based on the updated fly height measurement for each head in order to maintain the heads at a target fly height. In another embodiment, a fly height measurement may be generated while reading a periodic pattern in the servo sectors $20_0$-$20_N$, such as a preamble, postamble, or servo burst. In yet other embodiments, the fly height of each head $4_i$ may be measured by measuring a capacitance between the head and respective disk surface, or measuring a current flowing between the head and respective disk surface.

In the embodiment of FIG. 1D, each head $4_i$ comprises a write element 32 (e.g., an inductive coil) and a read element 34 (e.g., a magnetoresistive element). In one embodiment, each head $4_i$ may also comprise a separate touchdown sensor, such as a magnetoresistive element (not shown), that may be used to determine the FHA control signal 30 that causes each head to contact the respective disk surface. In other embodiments, the touchdown of each head may be detected by evaluating a perturbation in the read signal, a perturbation in the PES of the servo control system, a perturbation in the spindle motor controller that rotates the disk, a perturbation in a clock locked to the disk rotation frequency, or any other suitable metric. In one embodiment, after determining the FHA control signal 30 that causes a head touchdown, an operating level for the FHA control signal is generated by backing off the FHA control signal by a predetermined offset. After backing off the FHA control signal, a fly height measurement is generated for each head which becomes the target fly height for each head.

While the disk drive is deployed in the field, the fly height may be measured periodically for each head using any suitable technique. In one embodiment, the fly height is measured by reading a periodic pattern from the disk surface and evaluating the fundamental and harmonics of the resulting read signal (a harmonic ratio technique based on the Wallace spacing equation). In this embodiment, after calibrating the FHA back off from touchdown, the fly height measurement based on the harmonic ratio technique becomes the target fly height.

In one embodiment, at a periodic interval (which may vary as described below), the control circuitry 8 again reads the periodic pattern to measure a current fly height based on the harmonic ratio measurement, and compares the current fly height measurement to the target fly height measurement to generate a fly height delta for each head. In other embodiments, the target fly height measurement and current fly height measurement may be generated using a suitable fly height transducer that may measure, for example, the capacitance between the head and disk surface or the current flowing between the head and disk surface. The fly height delta measured for each head may be used to adjust the FHA control signal applied to the FHA of each head, thereby driving the fly height of each head toward the respective target fly height.

In one embodiment, the fly height delta measured for any particular head may be a relatively noisy signal that may not result in a sufficiently accurate FHA control signal, which may degrade performance of write/read operations particularly during transient conditions (e.g., changes in altitude). Filtering the fly height delta measurement for each head using a low pass filter may help attenuate the noise, but it may also induce an unacceptable delay in the transient response. For example, if there is a change in altitude, the response of the low pass filter may be to slow to adequately track the transient which may again degrade performance of write/read operations during and after the transient.

Figure 2A:
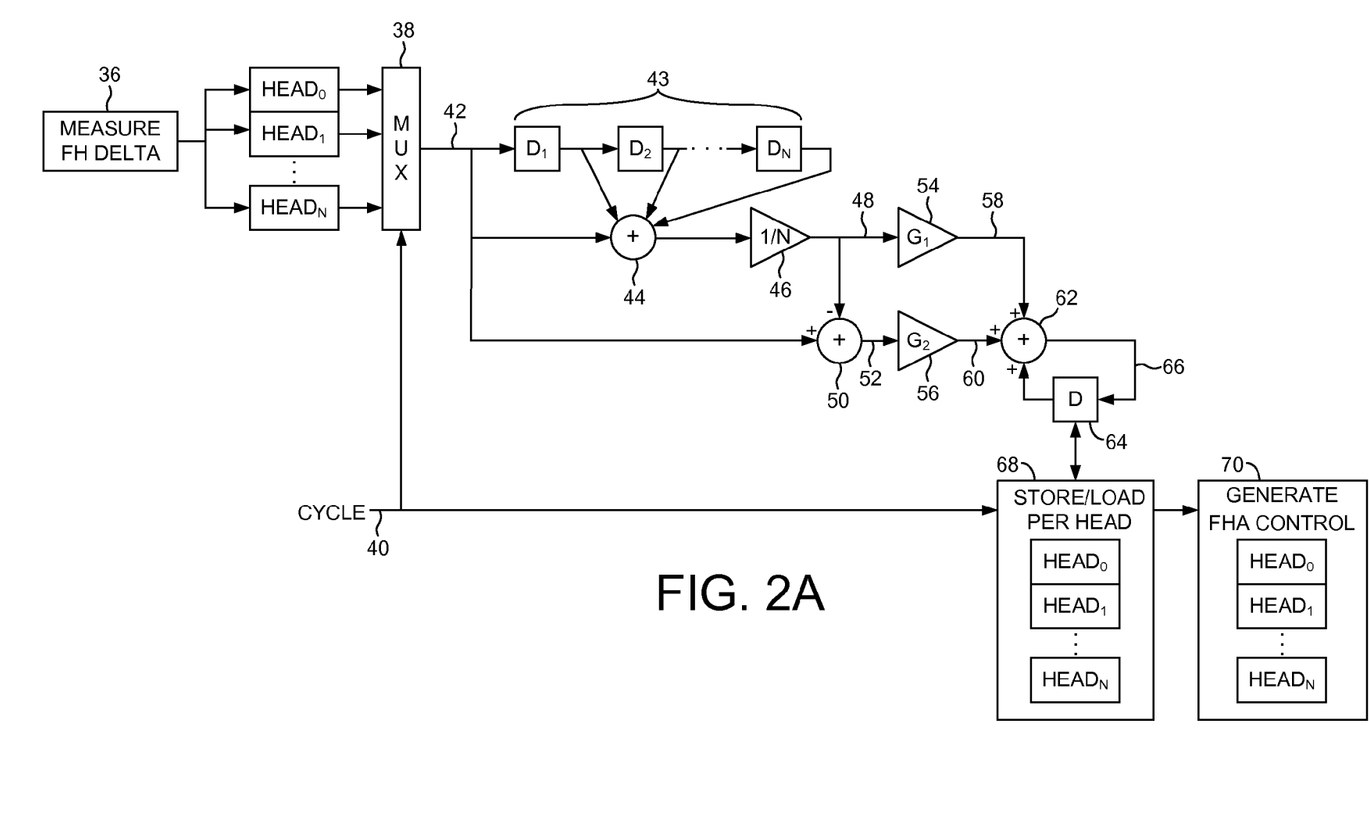
FIG. 2A shows an embodiment wherein an average fly height delta and a specific fly height delta measured for each head is integrated in order to adjust an FHA control signal for each head.

In one embodiment, the noisy fly height delta measurements for each head is compensated by employing a first filter that averages the fly height delta measurements for all of the heads, and a second filter that filters the fly height delta for each specific head. An example of this embodiment is shown in FIG. 2A, wherein during a calibration procedure a fly height delta is measured at block 36 for each head using, for example, one of the techniques described above. A multiplexer 38 controlled by a cycle signal 40 applies each fly height delta 42 to a delay line comprising a series of storage registers $D_1$-$D_N$ 43 corresponding to the N heads. The N fly height delta measurements are summed 44, and the sum divided by N at divider 46 to generate an average fly height delta 48. After measuring N fly height deltas in order to generate an average value 48, the current fly height delta 42 output by the multiplexer 38 is input into adder 50 which subtracts the average value 48 to generate a deviation value 52 representing the deviation of the fly height delta 42 from the average 48. The average value 48 is amplified by a first gain 54 and the deviation value 52 is amplified by a second gain 56. In one embodiment, the first gain 54 is significantly higher than the second gain 56 so that the average value 48 has a faster transient response to changes in environmental conditions (e.g., changes in altitude). Averaging the fly height deltas from all the heads helps attenuate the noise in each individual fly height delta, which enables the averaging filter to have a higher gain 54 and therefore a better transient response. The deviation value 52 generated for each head allows the system to adjust the FHA control signal 30 toward a value that compensates for variance between the heads, such as a variable gain of each FHA 6. In one embodiment, a lower gain 56 is configured for this filter which helps attenuate the undesirable affect of the noise in each individual fly height delta measurement.

In the embodiment of FIG. 2A, the amplified average value 58 and the amplified deviation value 60 are added at adder 62 together with a previous value stored in a register 64. The output 66 of the adder 62 replaces the value stored in the register 64, thereby implementing an integrator. A first storage array 68 stores the value in register 64 for each head. When the multiplexer 38 outputs the fly height delta for a head, that head's value is retrieved from the first storage array 68 and loaded into the register 64. The value in register 64 is then updated using one or more fly height delta measurements for the current head, and the updated value stored in register 64 is saved to the first storage array 68. A second storage array 70 stores the FHA control signal value for each head that corresponds to the target fly height calibrated during the touchdown procedure described above. The second storage array 70 also stores an adjustment value for the FHA control signal that corresponds to each integrated fly height delta stored in the first storage array 68. Each time the integrated fly height delta for a head is updated, the corresponding value in the first storage array 68 is added to the adjustment value in the second storage array 70. As adjustments are made to the fly height of a head, the integrated fly height delta stored in the first storage array 68 will integrate toward zero, and the corresponding adjustment value stored in the second storage array 70 will converge to a steady state value.

In one embodiment, when measuring the fly height delta for each head at block 36 of FIG. 2A, a number of measurements may be taken for each head and averaged. The averaged measurement may be output by the multiplexer 38 and stored in the storage registers $D_1$-$D_N$ 43. In addition, when updating the integrated fly height delta for a head, a number of fly height delta measurements (or a number of averaged measurements) may be used to generate a number of corresponding deviation values 52 for updating the integrated value stored in register 64.

In one embodiment, the control circuitry 8 may initialize the averaging filter shown in FIG. 2A during a calibration procedure, for example, by generating a fly height delta measurement for each head. The control circuitry 8 may also initialize the integrated deltas stored in the first storage array 68 during this calibration procedure. During a normal access operation of a particular disk surface, a fly height delta may be measured for the corresponding head using, for example, a periodic signal in a servo sector or a fly height transducer integrated with the head. The measured fly height delta may then be used to update the averaging filter by loading the fly height delta into the corresponding storage register $D_1$-$D_N$ 43. The measured fly height delta may also be used to generate a deviation value 52 in order to update the corresponding integrated delta stored in the first storage array 68. In one embodiment, the control circuitry 8 may periodically force an update of the integrated fly height delta for any head that has not been updated during normal access operations.

Figure 2B:
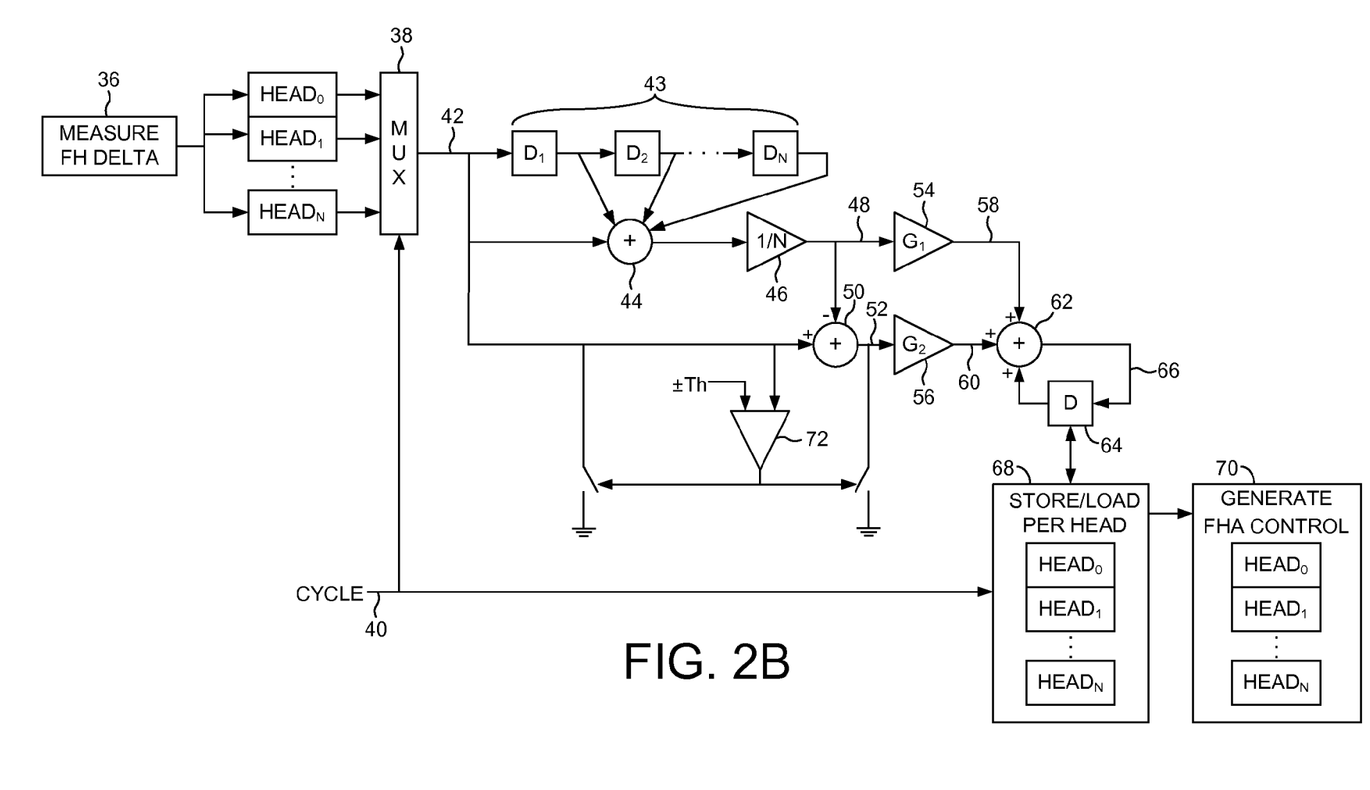
FIG. 2B shows an embodiment wherein the specific fly height delta may be disabled so that the FHA control signal for the specific head is adjusted based only on the average fly height delta of the other heads.

FIG. 2B shows an embodiment wherein when an outlier of the deviation value 52 is detected, the integrated fly height delta stored in register 64 is updated using only the average value 58 (independent of the deviation value 52). In one embodiment, an outlier of the deviation value 52 is detected when it exceeds a threshold (positive or negative) at comparator 72. When an outlier is detected, the corresponding fly height delta 42 and deviation value 52 are set to zero so that the measurement is not used to generate the average value 48 (N at divider 46 is decremented by one), or used to update the integrated value stored in register 64. That is, the average value 48 generated based on the fly height delta of the other heads is used to update the integrated delta value for the outlier head. In one embodiment, if one of the heads consistently generates an outlier deviation value 52, the fly height measurement for that head may be disabled permanently. The integrated delta for that head may continue to be updated based on the average value 48 generated for the other heads; that is, the fly height for the head may still be controlled reasonably well even though the fly height measurement for the head may have been disabled.

The particular configuration of elements shown in FIGS. 2A and 2B is illustrative and may be implemented in any suitable manner. For example, the averaging filter need not comprise a plurality of storage registers connected in series, but may be accessed directly using a suitable demultiplexer. In other embodiments, the filtering aspects, including the averaging and integrating, may be implemented by a microprocessor executing firmware. In the embodiment of FIG. 2B, a switch connecting to ground represents the embodiment where an outlier deviation measurement 52 is excluded from the first and second filters. However, connecting a switch to ground merely represents the aspect of zeroing the fly height delta measurement 42 as well as zeroing the deviation value 52. Other embodiments may employ suitable digital circuitry for multiplexing a zero value into the first and second filters, or suitable firmware for zeroing these values. In the embodiments of FIGS. 2A and 2B, a fly height delta is measured for each head in the disk drive, but other embodiments may measure a fly height delta for only a subset of the heads. For example, in one embodiment when one of the heads provides an unreliable fly height measurement as described above, the fly height measurement for that head may be disabled.

Figure 3A:
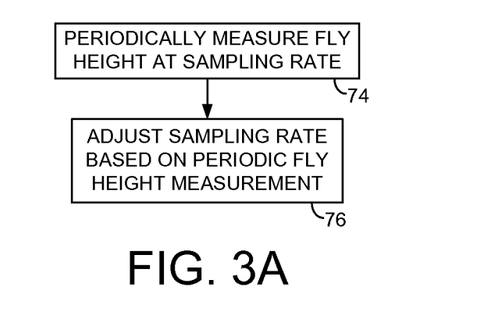
FIG. 3A is a flow diagram according to an embodiment wherein a sampling rate of the fly height measurements is adjusted based on the fly height measurements.
Figure 3B:
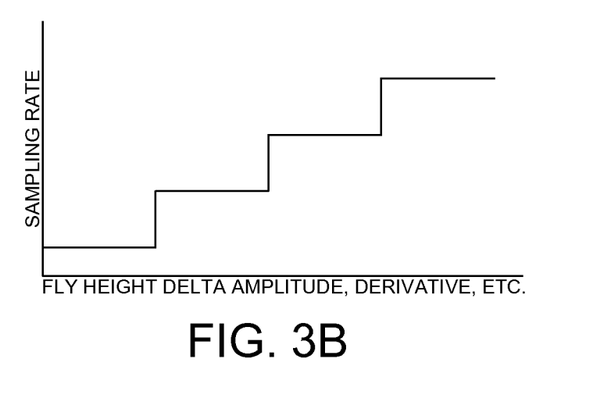
FIG. 3B shows an embodiment wherein the sampling rate of the fly height measurements is increased as the amplitude, or derivative of the amplitude, or other metric of a fly height delta exceeds a threshold.

In one embodiment, the control circuitry 8 updates the fly height delta measurements at a sampling rate that ensures the FHA control signal applied to each head will maintain the fly height at the target fly height within an acceptable margin. FIG. 3A is a flow diagram according to an embodiment wherein as the control circuitry 8 takes the periodic fly height measurements (block 74), the sampling rate for the fly height measurements is adjusted based on the fly height measurements (block 76). An example of this embodiment is illustrated in FIG. 3B, wherein the sampling rate may be increased (so as to take more measurements) as the amplitude of the fly height delta increases, or a derivative of the fly height delta increases, either of which may indicate that the fly height of the heads is changing faster due, for example, to the disk drive changing altitude. In one embodiment, the amplitude and/or derivative of the filtered fly height delta (e.g., the average value 48 or 58 in FIG. 2A) may be evaluated to adjust the sampling rate. The sampling rate of the fly height measurement may be increased at any suitable resolution, including fewer or more step increments than that shown in the example of FIG. 3B.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

As will be apparent, many variations on the systems and methods described above are possible. For example, while the above disclosure may have described processes as performed for "each" sector, zone, head, disk, disk surface or other component, in some cases, the processes may be performed for only one or some of the components and not necessarily for all of the components.

What is claimed is:

1. A disk drive comprising:
   a plurality of disk surfaces;
   a head actuated over each disk surface, where each head comprises a fly height actuator (FHA) operable to control a fly height of the head over the respective disk surface; and
   control circuitry operable to:
   measure a fly height for each head to generate a plurality of fly height measurements;
   calculate an average value in response to the plurality of fly height measurements;
   generate a first control value for a first head as a function of the calculated average value and the fly height measurement for the first head; and
   control the first FHA of the first head in response to the first control value.

2. The disk drive as recited in claim 1, wherein the control circuitry is further operable to generate the first control value as a function of the calculated average value and the fly height measurement for the first head and a previous control value for the first head.

3. The disk drive as recited in claim 1, wherein the control circuitry is further operable to:
   generate a second control value for a second head as a function of the calculated average value and the fly height measurement for the second head; and control the second FHA of the second head in response to the second control value.

4. The disk drive as recited in claim 1, wherein the control circuitry is further operable to:
measure a fly height delta for each head, wherein the fly height delta represents a difference between the measured fly height and a target fly height for each head;
generate the average value by averaging the fly height deltas; and
generate the first control value for the first head based on the average value and the fly height delta for the first head.

5. The disk drive as recited in claim 4, wherein the control circuitry is further operable to:
generate a first deviation value for the first head based on a difference between the fly height delta for the first head and the average value; and
generate the first control value for the first head based on the average value and the first deviation value for the first head.

6. The disk drive as recited in claim 5, wherein the control circuitry is further operable to:
amplify the average value by a first gain to generate a first amplified value;
amplify the first deviation value for the first head by a second gain less than the first gain to generate a second amplified value; and
generate the first control value for the first head by summing the first amplified value with the second amplified value.

7. The disk drive as recited in claim 5, wherein the control circuitry is further operable to:
compare the first deviation value for the first head to a threshold; and
when the first deviation value for the first head exceeds the threshold, set the second amplified value to zero in order to generate the first control value independent of the first deviation value for the first head.

8. The disk drive as recited in claim 1, wherein the control circuitry is operable to:
periodically measure the fly height for each head at a sampling rate; and
adjust the sampling rate based on the periodic fly height measurements.

9. The disk drive as recited in claim 8, wherein the control circuitry is operable to:
periodically measure a fly height delta for each head at the sampling rate, wherein the fly height delta represents a difference between the measured fly height and a target fly height for each head; and
adjust the sampling rate based on the periodic fly height delta measurements.

10. The disk drive as recited in claim 9, wherein the control circuitry is operable to increase the sampling rate when the periodic fly height delta exceeds a threshold.

11. The disk drive as recited in claim 9, wherein the control circuitry is operable to increase the sampling rate when a derivative of the periodic fly height delta exceeds a threshold.

12. The disk drive as recited in claim 9, wherein the control circuitry is operable to:
filter the periodic fly height delta to generate a filtered fly height delta; and
increase the sampling rate when the filtered fly height delta exceeds a threshold.

13. A method of operating a disk drive comprising a plurality of disk surfaces and a head actuated over each disk surface, where each head comprises a fly height actuator (FHA) operable to control a fly height of the head over the respective disk surface, the method comprising:
measuring a fly height for each head to generate a plurality of fly height measurements;
calculating an average value in response to the plurality of fly height measurements;
generating a first control value for a first head as a function of the calculated average value and the fly height measurement for the first head; and
controlling the first FHA of the first head in response to the first control value.

14. The method as recited in claim 13, further comprising generating the first control value as a function of the calculated average value and the fly height measurement for the first head and a previous control value for the first head.

15. The method as recited in claim 13, further comprising:
generating a second control value for a second head as a function of the calculated average value and the fly height measurement for the second head; and
controlling the second FHA of the second head in response to the second control value.

16. The method as recited in claim 13, further comprising:
measuring a fly height delta for each head, wherein the fly height delta represents a difference between the measured fly height and a target fly height for each head;
generating the average value by averaging the fly height deltas; and
generating the first control value for the first head based on the average value and the fly height delta for the first head.

17. The method as recited in claim 16, further comprising:
generating a first deviation value for the first head based on a difference between the fly height delta for the first head and the average value; and
generating the first control value for the first head based on the average value and the first deviation value for the first head.

18. The method as recited in claim 17, further comprising:
amplifying the average value by a first gain to generate a first amplified value;
amplifying the first deviation value for the first head by a second gain less than the first gain to generate a second amplified value; and
generating the first control value for the first head by summing the first amplified value with the second amplified value.

19. The method as recited in claim 17, further comprising:
comparing the first deviation value for the first head to a threshold; and
when the first deviation value for the first head exceeds the threshold, setting the second amplified value to zero in order to generate the first control value independent of the first deviation value for the first head.

20. The method as recited in claim 13, further comprising:
periodically measuring the fly height for each head at a sampling rate; and
adjusting the sampling rate based on the periodic fly height measurements.

21. The method as recited in claim 20, further comprising:
periodically measuring a fly height delta for each head at the sampling rate, wherein the fly height delta represents a difference between the measured fly height and a target fly height for each head; and
adjusting the sampling rate based on the periodic fly height delta measurements.

22. The method as recited in claim 21, further comprising increasing the sampling rate when the periodic fly height delta exceeds a threshold.

23. The method as recited in claim 21, further comprising increasing the sampling rate when a derivative of the periodic fly height delta exceeds a threshold.

24. The method as recited in claim 21, further comprising:
- filtering the periodic fly height delta to generate a filtered fly height delta; and
- increasing the sampling rate when the filtered fly height delta exceeds a threshold.

* * * * *